3,258,452
CURING COMPOSITIONS FOR CARBOXYL-CONTAINING POLYMERS
Roland J. Peffer, White Bear Lake, Minn., assignor to Minnesota Mining and Manufacturing Company, St. Paul, Minn., a corporation of Delaware
No Drawing. Filed Dec. 18, 1961, Ser. No. 160,236
7 Claims. (Cl. 260—75)

This invention relates to a novel curing composition. In one aspect this invention relates to an improved curing composition for carboxyl containing polymers. In still another aspect this invention relates to a curing composition for improving the curing rate of carboxyl containing polymers.

Although organic compounds having two or more aziridinyl groups can be used to effect the room temperature cure of carboxyl containing polymers, the cure rates have been generally low. The application of heat, which tends to accelerate the cure, is often either impossible because of the nature of the environment or undesirable because of the inconvenience and expense of providing an even or uniform heating cycle. While some carboxyl containing polymers can be chemically modified, for example, by increasing the number of carboxyl groups per molecule, the resulting excessive acid numbers and/or lowe molecular weight of the curable polymer often results in degradation of the cured product after exposure to high humidity and heat aging.

It is therefore an object of this invention to provide a novel curing system having azirane ring containing compounds therein.

A further object of this invention is to provide a curing composition containing aziridinyl compounds capable of effecting a rapid room temperature cure of certain liquid carboxyl containing polymers.

Still another object of this invention is to provide a curing system which can effect a relatively rapid room temperature cure of certain liquid carboxyl containing polymers to produce a firm, tack free cured product.

Yet another object is to provide a rapid curing process for certain liquid carboxyl containing polymers and to provide cured, tack free products thereby.

Various other objects and advantages will be apparent from the following description and examples.

The curing system of this invention contains an admixture of from about 5/1 to about 1/5 weight ratio respectively of (1) a liquid cyclic alkylenimido phosphorus nitrile having the formula

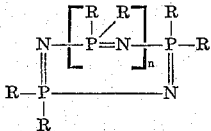

wherein $n$ is an integer from 1 to 2 and wherein R is an alkylenimido group of the formula

and $X_1$ and $X_2$ are selected from the group consisting of hydrogen, phenyl and alkyl radicals having from 1 to 4 carbon atoms; and (2) liquid carboxamides of the formula

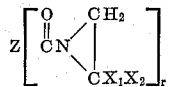

wherein $r$ is 2 or more (preferably 2 or 3), $X_1$ and $X_2$ are as defined above, and Z is an $r$-valent aliphatic, aromatic or alicyclic radical which may contain atoms other than carbon and hydrogen, e.g., oxygen, sulfur, etc. but not active hydrogen (i.e. a hydrogen atom which is active to the Zerewitinoff test, inert to Grignard reagents). The most preferred carboxamides are the N,N'-bis-1,2-alkylenamides of an aliphatic dicarboxylic acid having between 6 and about 55 carbon atoms.

The cyclic alkylenimido phosphorus nitriles and their preparation are described in U.S. Patent No. 2,858,306 and include 2,2,4,4,6,6-hexaaziridino-2,4,6-triphospha-1,3,5-triazine (i.e., trimeric bis-ethylenimido phosphorus nitrile);
2,2,4,4,6,6,8,8-octaaziridino-,2,4,6,8-tetraphospha-1,3,5,7-tetra-aza-cyclooctatetraene-1,3,5,7 (i.e. tetrameric bis-ethylenimido phosphorus nitrile);
2,2,4,4,6,6-hexa-(2'-methylaziridino)-2,4,6-triphospha-1,3,5-triazine (i.e. trimeric bis-2-methylethylene-imidophosphorus nitrile);
2,2,4,4,6,6-hexa - (2',2' - dimethyl - aziridino) 2,4,6-triphospha - 1,2,5 - triazine (i.e. trimeric bis - 2,2 - dimethylethylenimido phosphorus nitrile); etc.

The carboxamide compounds of the above formula include those in which Z is a trivalent organic radical, such as N,N',N''-trisethylenetrimesamide;
N,N',N''-tris-(methylethylene)-trimesamide;
N,N',N''-tris-(ethylethylene)-trimesamide;
N,N',N''-tris-(2',2'-dimethylethylene)-trimesamide, etc.

The N,N',N''-tris-(N,N-alkylene)-trimesamides and their preparation are described in U.S. Serial No. 832,152, filed August 7, 1959, now U.S. Patent No. 3,115,474. Aliphatic N,N',N''-tris-(N,N-alkylene carboxamides) may also be employed, e.g., the ethylenamide of Emery 3020–S polymerized fatty acid (produced by reacting $PCl_3$ with Emery 3020–S polymerized fatty acid, a product from the polymerization of $C_{18}$ unsaturated fatty acid having an average of 44 carbon atoms, an iodine value of 35–45, a neutralization equivalent of 295–310, a refractive index at 25° C. of 1.4858, and a monomer:dimer:trimer weight of 3:72:25).

Bis-1,2-alkylenamides (or bis-(N,N-alkylene) carboxamides) and their preparation are described in United States Serial Number 832,152 (filed August 7, 1959), now U.S. Patent No. 3,115,474, Serial Number 840,255 (filed September 16, 1959), now U.S. Patent No. 3,115,-482, and Serial Number 850,330 (filed November 2, 1959), now U.S. Patent No. 3,115,490. Generally, their preparation involves the reaction of an alkylenimine in an aqueous phase with a solution of a dicarboxylic acid halide in a water immiscible organic solvent in the presence of an acid acceptor at a temperature between about −5° C. and 30° C. Illustrative of the N,N'-bis-1,2-alkylenamides in accordance with this invention are N,N'-bis-1,2-ethylenadipamide;
N,N'-bis-ethylenepentadecyladipamide;
N,N'-bis-1,2-butylenadipamide;
N,N'-bis-1,2-ethylenepimelamide;
N,N'-bis-ethylene thiodipropionamide;
N,N'-bis-ethylene oxydipropionamide;
N,N'-bis-1,2-ethylenisosebacamide;
N,N'-bis-1,2-butylenisosebacamide;
N,N'-bis-1,2-ethylenesebacamide;
N,N'-bis-1,2-ethylenesuberamide;
N,N'-bis-1,2-propylenesuberamide;
N,N'-bis-1,2-butylenesuberamide;
N,N'-bis-1,2-ethylenazelaamide;
N,N'-bis-1,2-propylenazelaamide;
N,N'-bis-1,2-butylenazelaamide;
N,N'-bis-1,2-ethylenedodecanoyldicarboxylic acid amide;

N,N'-bis-1,2-ethylenetetradecanoyldicarboxylic acid amide;
N,N'-bis-1,2-propylenetetradecanoyldicarboxylic acid amide;
N,N'-bis-1,2-ethylenehexadecanoyldicarboxylic acid amide;
N,N'-bis-1,2-ethylenoctadecanoyldicarboxylic acid amide;
N,N'-bis-1,2-propylenoctadecanoyldicarboxylic acid amide;
N,N'-bis-1,2-propylenedodecanoyldicarboxylic acid amide;
N,N'-bis-1,2-pentylenesebacamide;
N,N'-bis-1,2-ethylene monadecanediamide;
N,N'-bis-1,2-ethylene-1,4-naphthalenedicarboxamide;
N,N'-bis-1,2-propylene-1,4-naphthalenedicarboxamide;
N,N'-bis-1,2-ethylene-4,4'-bis-phenyl dicarboxamide;
N,N'-bis-1,2-propylene-4,4'-biphenyl dicarboxamide;
N,N'-bis-1,2-ethylene hexahydroterephthalamide;
para-(N-1,2-ethylene carboxamidophenyl)-N-1,2-ethylene acetamide;
N,N'-bis-1,2-ethylene isophthalamide;
N,N'-bis-1,1-dimethylethylene isophthalamide;
N,N'-bis-1,2-butylene isophthalamide;
N,N'-bis-1,2-ethylene hexahydroisothalamide; etc.

The preferred aliphatic bis-1,2-alkylenamides are represented by the above formula wherein Z is a branched or straight chain alkylene radical having from about 2 to about 40, preferably from about 4 to about 20, carbon atoms. The preferred aromatic bis-1,2-alkylenamides are represented by the above formula wherein Z is 1,3-phenylene, 1,4-phenylene, 1,4-naphthalene, or 4,4'-bisphenyl. The following Example I illustrates the preparation.

*Example I*

N,N'-bis-ethylene isosebacamide is prepared by the reaction of ethylenimine with isosebacoyl dichloride to produce the desired substantially pure monomer, with hydrogen chloride as a by-product. Specifically, it may be prepared as follows:

A solution of about 95.6 parts of isosebacoyl dichloride prepared from isosebacic acid dissolved in 400 parts of diethyl ether is added dropwise with cooling and vigorous stirring to a flask containing a solution of 110 parts of potassium carbonate and 43 parts of ethylenimine in 800 parts of water. The temperature of the mixture is maintained below 15° C. and the acid chloride is added at a rate of approximately 1 part per minute. The reaction mixture is allowed to warm gradually to room temperature, while stirring, for an additional hour. During the total reaction period, the pH of the reaction mixture had dropped from approximately 12.5 at the beginning of the reaction to about 8.6 at the end. The ether layer is separated, dried over solid anhydrous sodium hydroxide at 0° C. for 1 hour, the sodium hydroxide is removed by filtration and the ether removed from the filtrate under reduced pressure. The resulting reaction product, N,N'-bis-1,2-ethylenisosebacamide, remains as a water-white liquid.

Desirably, the 1,2-alkylenimine is introduced in an aqueous solution which also contains an alkali metal carbonate, such as sodium, potassium or lithium carbonate, which acts as an acid-acceptor to neutralize the hydrogen chloride formed during the preparation of the alkylenimine derivative to be used as curing agents within the scope of this invention. When a higher 1,2-alkylenimine than 1,2-ethylenimine, i.e., one containing more than two carbon atoms, is employed, an alkali metal bicarbonate, such as sodium, potassium or lithium bicarbonate may be used as the acid acceptor instead of a carbonate. This aqueous solution is intimately mixed with the other reactant, e.g., a carboxylic acid chloride, dissolved in a substantially water-immiscible organic solvent which is chemically inert to both the reactants and the reaction products and in which the resulting alkylenimine derivative is soluble. The alkylenimine derivative is then recovered in a relatively pure, stable state in high yield from the organic solvent, in which it collects as the reaction proceeds by evaporating the solvent. By this process of producing the alkylenimine derivatives any possibility of attack on and decomposition of the product by hydrogen chloride and other contaminants or by-products is effectively minimized.

The curing systems of this invention are particularly outstanding in their ability to cure liquid, 100% solids polyesters rapidly to a tack free product. In fact, the relatively high cure rates obtained with these curing systems exceed that of each of the respective curative compounds alone. These results are achieved when the curing composition contains from about 5/1 to about 1/5 weight ratio of the cyclic alkylenimido phosphorus nitrile to the carboxamide, preferably in the 1/1 to 1/5 weight ratio range. Other non-curative ingredients may be included in the curing compositions, such as fillers (e.g., silica, titanium dioxide, zirconium silicate, and other refractory materials), plasticizers, etc. For maximum stability and "shelf life," these curing systems should be essentially anhydrous and free of active hydrogen containing compounds.

The curing reaction commences upon admixture of the polymer and curative. If desired, room temperature cure rates may be accelerated by using elevated temperatures. Although the compositions of this invention may be used to cure a variety of polymers, including epoxy resins and polymers having active hydrogen atoms, they are especially useful in curing low molecular weight polyesters having at least two carboxyl groups per molecule. Such cured polyesters have a high degree of thermal stability while retaining desirable mechanical and chemical properties at elevated temperatures. Moreover, it is possible to obtain cured elastomeric products which are relatively insensitive to moisture, are flexible at low temperatures, and can be cured at room temperatures without troublesome gas formation. Among the preferred polymers which may be cured with the compositions of this invention are the liquid polyesters of a diol, a dibasic acid, and a polyfunctional organic compound such as a polyanhydride, a polyol and a polybasic acid. The following will illustrate the preparation of such a liquid polyester.

About 515 grams (2.55 mols) of isosebacic acid, 221 grams (2.12 mols) of neopentyl glycol and 13.5 grams (0.1 mol) of trimethylolpropane were charged to a stirred flask. The reaction mixture contained about 15 percent excess of carboxyl groups over hydroxyl groups and about 3 percent of these functional groups were provided by trimethylolpropane. The reaction was carried out at approximately 160–180° C. in a nitrogen atmosphere. When approximately the theoretical amount of water of esterification was driven off (indicating that the reaction is essentially complete) the pressure was reduced gradually and the temperature was increased to 250° C. The reaction was terminated when the acid number of the melt reached 60.6. The viscosity of the resulting polyester was found to be 3700 centipoises at 150° F. when measured with a Brookfield viscometer. The average molecular weight was 3000–4000.

The liquid carboxyl-containing polyesters cured with the curing compositions of this invention may be cast in inexpensive molds rather than in high pressure and/or high temperature molds. When cured on fabrics, paper and leather for such uses as in lightweight tarpaulins, radomes, electrical insulation, collapsible storage and shipping containers, protective clothing and shoes, upholstery, etc., they form tough, flexible coatings having good low temperature flexibility and abrasion resistance. Because certain of the liquid polyesters cured with these compositions display outstanding resistance to thermal blast and thermal erosion, they may be applied as protective coatings on surfaces, such as steel, wood, etc. and are therefore useful as shell liners and propellant binders for rockets and other pyrotechnic devices, particularly when loaded with refractory materials such as silica, titanium dioxide, zirconium silicate, etc. These cured polymers also provide useful adhesives and sealants which show good adhesion to metals, glass, wood, and other synthetic and natural polymers. Elastomeric adhesives and sealants of this type find valuable application in the aircraft and missile industry, as pressure cabin sealants for aircraft, exterior sealants for aluminum aircraft parts, etc.

The increased cure rate provided by the curing compositions of this invention will be illustrated by the data set forth in Table I. The polymer cured was polyneopentyl isosebacate polyester (137.0, equivalent wt.; 50, acid number; 3710, calculated molecular weight; 0.68, branch per mol; 3, hydroxyl number; viscosity at 25° C., 46,000 centipoises). Samples A–I differ in the curative composition used. The amount of curative used per 100 parts by weight of polyester composition (38 wt. percent polymer) was adjusted in each sample to afford 0.0681 equivalent of aziridine ring per 100 parts by weight of polyester composition. From the results of the accelerated cure at 72° F., the Rex Durometer hardness values indicate the significantly higher cure rates and the lower tack of samples A–G as compared to samples H and I.

Table II shows the thermal and thermal erosion resistance of the cured samples appearing in Table I. The following test was employed. This test procedure involves casting and curing a ¼ inch thickness of material on a 2 inch diameter low carbon steel disc (0.250 inch thickness). This test specimen is then cemented into a specimen holder with plaster of Paris, and a copper-constantan thermocouple is attached to the bottom of the steel disc. The test specimen is positioned 3¼ inches from an oxy-acetylene torch tip. The oxygen and acetylene pressures are adjusted to 40 and 14 p.s.i.g. respectively, providing a flame temperature of about 5500° F. or a heat input rate sufficient to heat a ⅛ inch thick copper disc to 900° F. in 3 seconds. The test specimen is subjected to the oxy-acetylene flame impingement for 60 seconds, and temperature measurements of the cold side of the steel disc are taken at 15 second intervals to measure insulation efficiency. Erosion rates are calculated from weight loss values. The data reported in Table II shows a significant improvement in insulative efficiency and thermal erosion rate in samples A–C as compared to samples D–H and equivalent results to sample I. The hexa-[1-(2-methyl)aziridinyl] phosphatriazine used in the samples of Tables I and II contained about 20 weight percent of tetramer, i.e., octa-[1-(2-methyl)aziridinyl] phosphatetrazine, and cyclic [1-(2-alkyl)aziridinyl] phosphorus nitriles having less than about 25 weight percent of tetramer is generally preferred.

Through the use of these liquid curing systems room temperature cures of carboxyl-containing liquid polymers, including polyesters, polyethers, polybutadienes, butadiene-acrylonitrile copolymers, etc. which are modified or chain terminated with carboxyl-containing compounds, may be obtained with both an acceptably rapid cure rate and a tack free cured product. Superior resistance to thermal erosion and insulative efficiency of such cured polyester systems, compared to similar polyesters cured with the cyclic phosphorus nitrile compounds alone, has been shown. Moreover, the resistance to hydrolysis of the polyesters cured with the curing compositions described earlier is superior to similar polyesters cured with the carboxamide compounds alone at elevated temperatures and in a high humidity environment.

Various other embodiments of the present invention and additional uses therefor will be apparent to those skilled in the art without departing from the scope or spirit of this disclosure.

TABLE II.—INSULATIVE EFFICIENCY AND THERMAL EROSION RESISTANCE

| Samples | A | B | C | D | E | F | G | H | I |
|---|---|---|---|---|---|---|---|---|---|
| Percent weight loss | 48.5 | 48.7 | 54.8 | 83.2 | 87.6 | 83.7 | 87.6 | 84.0 | 53.8 |
| weight loss (gms./sec.) | 0.182 | 0.178 | 0.218 | 0.340 | 0.443 | 0.430 | 0.433 | 0.319 | 0.210 |
| Percent thickness loss | 63.0 | 65.4 | 70.2 | 100 | 100 | 100 | 100 | 96.5 | 65.5 |
| Thickness loss (inches ×10⁻³/sec.) | 2.84 | 2.84 | 3.33 | 4.83 | 6.06 | 6.12 | 5.70 | 4.50 | 3.00 |
| $T_0$ (initial) (° F.) | 75 | 72 | 72 | 74 | 74 | 72 | 72 | 73 | 74 |
| $T_{15}$ (15 seconds) (° F.) | 72 | 70 | 70 | 72 | 72 | 70 | 72 | 72 | 72 |
| $T_{30}$ (30 seconds) (° F.) | 75 | 75 | 75 | 75 | 80 | 80 | 75 | 75 | 75 |
| $T_{45}$ (45 seconds) (° F.) | 87 | 88 | 87 | 90 | 250 | 250 | 140 | 93 | 105 |
| $T_{60}$ (60 seconds) (°F.) | 110 | 111 | 114 | 190 | | | 250 | 150 | 135 |

TABLE I

| Samples | A | B | C | D | E | F | G | H | I |
|---|---|---|---|---|---|---|---|---|---|
| Curative: | | | | | | | | | |
| N,N'-bis-ethylene isosebacamide (equivalent weight, 137.0) | 25 | 25 | 25 | 25 | 15 | 10 | 4 | | 25 |
| Hexa-[1-(2-methyl)aziridinyl] phosphatriazine (equivalent weight, 85.0) | 5 | 10 | 15 | 25 | 25 | 25 | 25 | 25 | |
| Equivalent weight of curative mixture | 128.3 | 122.1 | 117.5 | 111.0 | 104.5 | 99.8 | 93.7 | 85.0 | 137.0 |
| Parts by weight of curative per 100 parts by weight of polyester composition* | 8.74 | 8.31 | 8.00 | 7.56 | 7.12 | 6.80 | 6.38 | 5.79 | 9.33 |
| Cure Rate: | | | | | | | | | |
| 24 hour Rex durometer value | ¹15 | ²30 | ³40 | ³45 | ³50 | ³45 | ²40 | ⁴15 | ⁵0 |
| 48 hour Rex durometer value | ²30 | 45 | 50 | 55 | 60 | 55 | 50 | ²30 | ⁵0 |
| Working Life (approximate) (hours) | 5.0 | 4.5 | 3.0 | 2.5 | 2.5 | 3.0 | 4.0 | 5+ | 24+ |

¹ Some tack. ² Slight tack. ³ Very slight tack. ⁴ Very tacky. ⁵ Fluid.
*Polyester composition contained 38.0% polymer and 62.0 wt. percent inert fillers ($SiO_2$, $TiO_2$, $ZrSiO_4$).

I claim:

1. A curing composition suitable for use in curing carboxyl-containing liquid polymers which comprises between about 5:1 and about 1:5 weight ratio respectively of (a) a normally liquid trimeric bis-alkylenamido-phosphorus nitrile having the formula

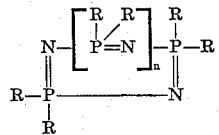

wherein $n$ is an integer from 1 to 2 and wherein R is an alkylenimido group of the formula

wherein $X_1$ and $X_2$ are selected from the group consisting of hydrogen, phenyl and alkyl radicals having from 1 to 4 carbon atoms; and (b) a normally liquid carboxamide of the formula

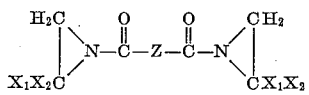

wherein $X_1$ and $X_2$ are as defined above and Z is a divalent organic radical selected from the group consisting of aliphatic, aromatic and alicyclic radicals and Z contains no active hydrogen atoms.

2. The curing composition of claim 1 wherein Z is an alkylene radical having from about 4 to about 20 carbon atoms.

3. The curing composition of claim 1 in which the alkylenimido groups are 2-methyl aziridinyl groups.

4. A curing composition suitable for use in curing carboxyl-containing liquid polymers which comprises between about 1:5 and about 3:5 weight ratio respectively of 2,2,4,4,6,6-hexa-(2'-methylaziridinyl)-2,4,6-triphospha-1,3,5-triazine and a normally liquid carboxamide of the formula

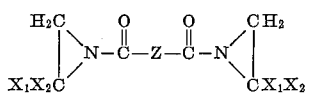

wherein $X_1$ and $X_2$ are selected from the group consisting of hydrogen, phenyl and lower alkyl radicals having from 1 to 4 carbon atoms and Z is an alkylene radical having from 4 to about 20 carbon atoms.

5. The product produced by the process of intimately contacting a carboxyl-containing liquid polyester with a curing composition which comprises between about 5:1 and about 1:5 weight ratio respectively of (a) a normally liquid trimeric bis-alkylenamido-phosphorus nitrile having the formula

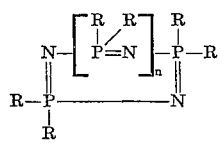

wherein $n$ is an integer from 1 to 2 and wherein R is an alkylenimido group of the formula

wherein $X_1$ and $X_2$ are selected from the group consisting of hydrogen, phenyl and alkyl radicals having from 1 to 4 carbon atoms; and (b) a normally liquid carboxamide of the formula

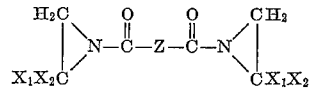

wherein $X_1$ and $X_2$ are as defined above and Z is a divalent organic radical selected from the group consisting of aliphatic, aromatic and alicyclic radicals and Z contains no active hydrogen atoms.

6. The product of claim 5 in which said carboxyl-containing liquid polymer is a carboxyl-containing polyester having at least 2 carboxyl groups per molecule.

7. The product produced by the process of intimately contacting a carboxyl-containing liquid polyester with a curing composition which comprises between about 1:5 and about 3:5 weight ratio respectively of 2,2,4,4,6,6-hexa - (2' - methylaziridinyl) - 2,4,6-triphospha-1,3,5-triazine and a normally liquid carboxamide of the formula

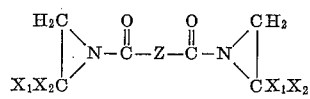

wherein $X_1$ and $X_2$ are selected from the group consisting of hydrogen, phenyl and lower alkyl radicals having from 1 to 4 carbon atoms and Z is an alkylene radical having from 4 to about 20 carbon atoms.

References Cited by the Examiner
UNITED STATES PATENTS

| | | | |
|---|---|---|---|
| 2,858,306 | 10/1958 | Ratz et al. | 260—239 |
| 3,079,367 | 2/1963 | Fran et al. | 260—239 |
| 3,115,474 | 12/1963 | Smith | 260—2 |
| 3,115,490 | 12/1963 | Smith | 260—2 |

LEON J. BERCOVITZ, *Primary Examiner.*

NORMAN G. TORCHIN, DONALD E. CZAJA,
*Examiners.*

J. J. KLOCKO, *Assistant Examiner.*